May 22, 1956 F. H. HAMAL 2,746,882
COATED PARTS HANDLING BUGGY AND METHOD OF COATING SAME
Filed Aug. 20, 1952 2 Sheets-Sheet 1

INVENTOR.
Ferdinand H. Hamal

May 22, 1956  F. H. HAMAL  2,746,882
COATED PARTS HANDLING BUGGY AND METHOD OF COATING SAME
Filed Aug. 20, 1952  2 Sheets-Sheet 2

INVENTOR.
Ferdinand H. Hamal
BY
ATTORNEYS

United States Patent Office 2,746,882
Patented May 22, 1956

2,746,882

COATED PARTS HANDLING BUGGY AND
METHOD OF COATING SAME

Ferdinand H. Hamal, Royal Oak, Mich., assignor to Vinco
Corporation, Detroit, Mich., a corporation of Michigan Application August 20, 1952, Serial No. 305,331

5 Claims. (Cl. 117—102)

This invention relates to a vehicle for conveying delicate objects and more particularly to a buggy for carrying finely surfaced machine parts.

It is becoming common to manufacture in mass production quantities metallic machine parts whose principal value resides in their extremely fine surfaces. The slightest scratch may, for all practical purposes, amount to complete destruction of such a part since removal of a scratch requires further machining which will reduce the dimensions of the part below the very precise standards set for them.

Likelihood of scratching and other types of surface damage necessarily increases with the frequency and carelessness with which the parts are handled, yet they must be subjected to all the incidents of mass production techniques such as transportation in large numbers between separated locations in a factory, and innumerable inspections for completeness and dimensional accuracy. Customarily, the parts are individually packed in multi-celled soft wood crates even for transportation between relatively close stations in the same factory. This renders the parts inaccessible for inspection until they are removed from the crate. Following the inspection, each part must be repacked before being carried to the site of the succeeding inspection or machining operation. It is only too apparent that this constant handling is expensive and time consuming, and with each handling the possibility of damage increases. Furthermore, constant care must be taken to keep the crate cells free from all foreign matter which might damage the parts.

I have invented a parts handling buggy which is extremely well suited to the safe and rapid intra-shop carriage of delicate machine parts and which maintains each part separated from the others in a posture which permits most inspections to be made without removing the parts from the buggy. This eliminates much handling of the parts and the usual need for inspection benches on which to lay out the parts during inspection. Furthermore, the construction of the buggy is such that, unlike a closed crate, it does not permit the accumulation of dirt and other deleterious foreign matter.

I achieve these and other salutary features by providing a wheeled and castered chassis with an open superstructure of tubular members. The superstructure of the buggy has a number of cradles especially constructed and arranged to separately support the individual parts in postures making them readily accessible for inspection. This superstructure is coated in a novel manner with a soft but tough thermosetting plastic material which protects the parts from scratching and other damage through accidentally rough contact with the superstructure during loading and unloading of the buggy. This coating also provides the cradles on which the parts rest during transit with soft, non-abrasive surfaces. The coating process of my invention produces an extra thick and somewhat irregular layer of protective coating for those areas of the cradles most often in contact with parts being carried, thus combining utmost protection for the parts with long wear of the buggy.

I have chosen as a specific example to illustrate my invention a parts handling buggy which is presently being employed with great satisfaction for handling gears and other aircraft jet engine parts having an extremely high degree of accuracy and surface finish. This particular buggy is fully explained in the following description and is illustrated in the accompanying drawings of which Fig. 1 is a perspective view of a parts handling buggy showing a variety of machine parts thereon;

Fig. 5 is a partial plan view of the part supporting cradle of the buggy.

Figure 1:
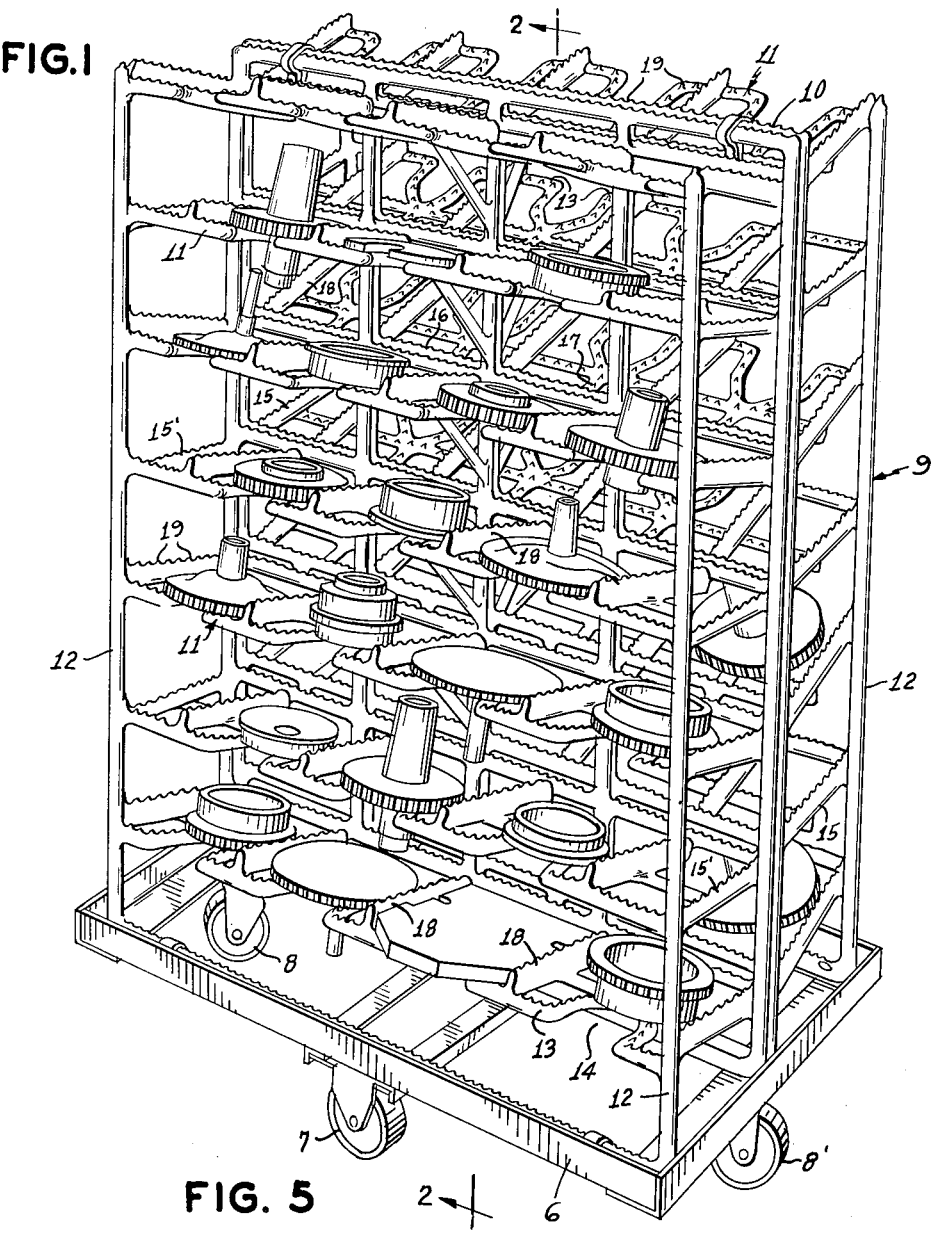
Figure 2:
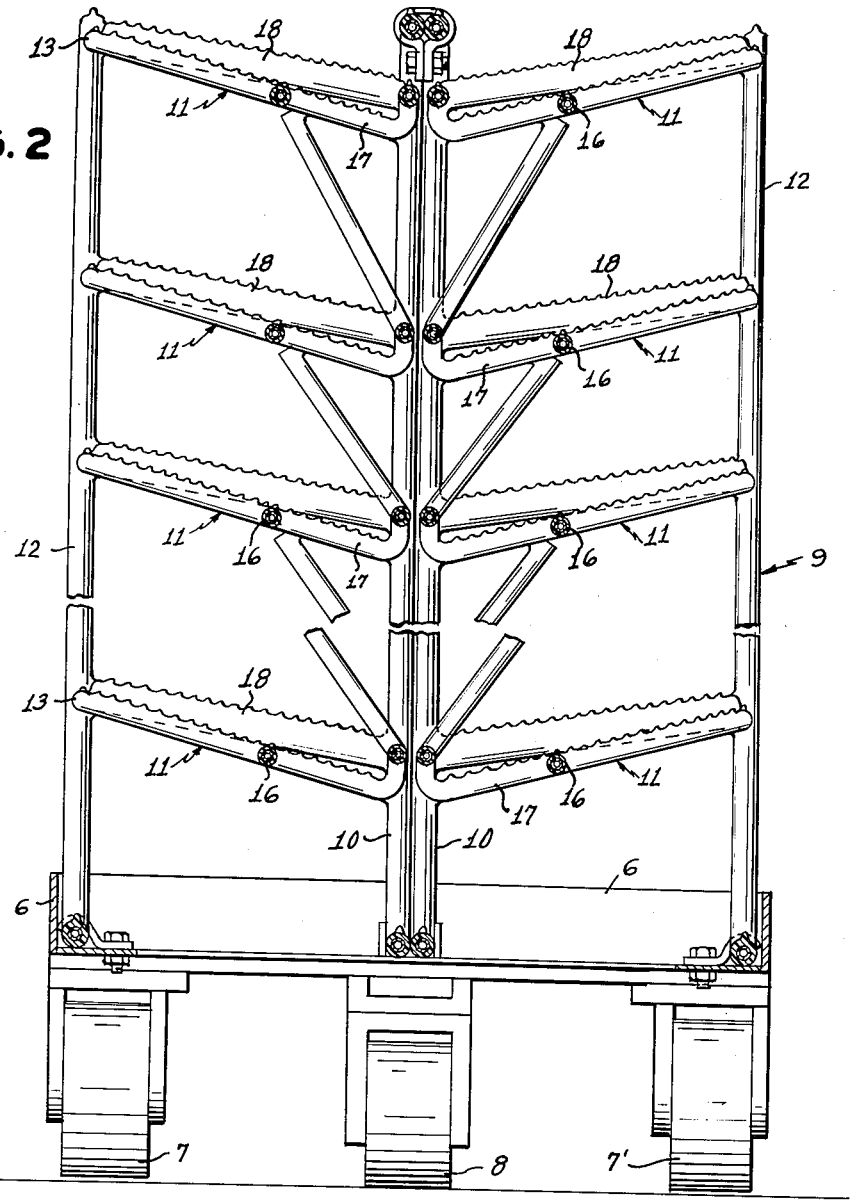
Fig. 2 is a sectional view of the buggy of Fig. 1 along the lines 2—2.

Referring now to Figs. 1 and 2 the parts handling buggy according to my invention has a rectangular chassis 6 constructed of longitudinal and transverse angle members. This chassis is provided with two rollers 7 and 7' under its opposite longitudinal members and two casters 8 and 8' located at opposite ends of the chassis. The superstructure 9 of the buggy includes a vertical framework 10 of welded tubular construction disposed longitudinally of the chassis midway between its sides. Extending outwardly and inclining upwardly from each side of this vertical framework are shelf members 11 which are supported at the opposite ends of their outboard edges by vertical posts 12.

Inasmuch as all of the shelf members of this particular buggy have the same basic structure, the description of one shelf member will suffice for these purposes. As shown in Fig. 5, the basic component of the shelf member is a tubular member 13 which is formed to define the outboard edge and the longitudinally spaced recesses 14 in the plane of the shelf which are to receive the parts to be carried. The innermost sections of these recesses are substantially V-shaped to accommodate depending cylindrical portions of parts having varying diameters. In order that the greatest number of parts may be accommodated without interference between them in a buggy having the least overall dimensions, the V-shaped recesses or cradles of one shelf member are shifted laterally with respect to the recesses of the shelf members next above and below the shelf member in question. Thus, where the parts being carried by the buggy are gears having relatively long hubs, the hubs of parts on one shelf member extend between the hubs of parts on the shelf member next above or below and avoid interference between them. This feature is well illustrated by several of the parts shown on the second and third lowermost shelf members of the buggy illustrated in Fig. 1.

Tubular end members 15 and 15' for the shelf member are provided between the vertical framework 10 and the vertical supporting posts 12. Between these end members there is fixed a longitudinal spar 16 which is positioned to be fixed to and support the apex of each V-shaped recess. Transverse rigidity in the plane of the shelf member is provided by short transverse spars 17 between the apexes of the recess of the tubular member and the framework 10. Additionally, there are transverse partition members 18 between the outboard edge of the shelf member and the framework. These partition members stand above the general level of the shelf member and serve to prevent contact between parts in adjoining cradles. This particular design for the shelf members results in cradles which are particularly well suited to support parts comprising one or more cylindrical components such as the several varieties of gears illustrated in Fig. 1. The cradle is equally well suited for carrying rectangular or circular plate-like parts whose dimensions permit them to rest flat on the upper surfaces of the cradle.

Figure 3:
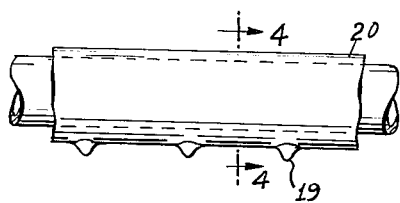
Fig. 3 is a view of one of the coated tubular elements of the framework of the buggy.
Figure 4:
Fig. 4 is a sectional view along the lines 4—4 of Fig. 3.

To provide a tough yet soft cushioning surface for the parts to be carried by the buggy, the entire superstructure of the buggy is given a coating of a suitable thermosetting plastic material such as a vinyl plastisol. Generally speaking, a vinyl plastisol is a viscous, liquid compound which may be heat cured to produce a corrosion-resistant coating having many of the desirable properties of soft rubber. Vinyl plastisols are well known compounds and a commercially available plastisol suitable for use in connection with the present invention is marketed under the name "Microsol E1003" by the Michigan Chrome and Chemical Co. of Detroit, Michigan. According to my invention the superstructure is inverted and dipped into a tank containing the thermosetting vinyl plastisol and then withdrawn. The thermosetting plastic material is allowed partially to drain off the superstructure and the drain tips 19 formed during draining are permitted to remain. The result of this dipping and draining is best illustrated in Figs. 3 and 4. There it is seen that the tubular framework as illustrated acquires a coating 20 of thermosetting material which varies in thickness, being relatively thin on the uppermost surfaces of the inverted superstructure and increasing to substantially greater thicknesses on the lowermost surfaces. It is along this lowermost surface that the drain tips 19 are formed.

When the desired degree of draining is obtained, the superstructure, still in the inverted position, is baked at an elevated temperature and for a period of time which are characteristic of the particular thermosetting plastic material used. In the case of the material known as Microsol No. E1003, it has been found that the superstructure is most satisfactorily coated if it is heated to approximately 200° F. before dipping and the coated superstructure is then baked at approximately 450° F. for a period of approximately one-half hour. This provides a non-abrasive and resilient coating for the superstructure which, when the superstructure is in its upright position, is substantially thicker, hence longer wearing and affording greater protection, over those areas of the superstructure which will contact the parts to be carried.

I thus provide a simple and effective means for transporting parts, such as extremely delicate gears, with a minimum of danger to their fine surfaces. At the same time the parts are maintained in a readily accessible condition for most inspections of their completeness and dimensional accuracy without necessitating their removal from their separate cradles in the buggy.

Having fully described a particular embodiment of my invention, I claim:

1. A buggy for conveying machine parts comprising a superstructure formed of elongated generally cylindrical members and including shelf members having a plurality of cradles therein constructed and arranged to receive and support generally cylindrical objects, and a coating of non-abrasive, resilient material on said superstructure which coating includes a plurality of drain tips.

2. A buggy for conveying machine parts comprising a superstructure formed of tubular members and including inclined superposed shelf members, each of said shelf members having a plurality of substantially V-shaped recesses extending inwardly of the shelf member from the uppermost edge thereof, and a coating of non-abrasive, resilient material on all surfaces of the superstructure, said coating being variable and irregular in thickness, said coating including a plurality of drain tips over the uppermost surfaces of the tubular members.

3. A buggy for conveying machine parts comprising a superstructure formed of tubular members and including laterally inclined superposed shelf members, each of said shelf members having a plurality of substantially V-shaped recesses extending inwardly of the shelf member from the uppermost edge thereof, the recesses of one shelf member being displaced longitudinally of the buggy with respect to the recesses of the shelf members next above, upstanding transverse partitions between adjacent recesses, of a shelf member and a coating of non-abrasive, resilient material over all surfaces of the superstructure, the coating being variable and irregular in thickness, said coating including a plurality of drain tips over the uppermost surfaces of the tubular members and partitions.

4. A rack for supporting machine parts comprising a structure of tubular members having a plurality of superposed shelf members constructed and arranged to form individual cradles to receive and support machine parts separate from each other, and a coating of non-abrasive, resilient material on said structure, the coating having variable and irregular depth, said coating including a plurality of drain tips over the uppermost surfaces of the shelf members.

5. The method of applying a non-abrasive, resilient coating of varying and irregular depth to the surfaces of a rack for supporting delicate machine parts which comprises the steps of inverting the rack to be coated, dipping the rack in a vat of thermosetting plastic material, withdrawing the rack from the vat, draining the excess material from the rack and permitting the drain tips formed thereby to remain, and baking the rack thus coated at a temperature high enough and for a period of time long enough to effect a permanent set of the plastic material on the rack.

References Cited in the file of this patent

UNITED STATES PATENTS

| | | |
|---|---|---|
| 14,320 | Lincoln | Feb. 26, 1856 |
| 1,205,015 | Prumm | Nov. 14, 1916 |
| 1,691,859 | Schelben | Nov. 13, 1928 |
| 1,698,318 | Norton | Jan. 8, 1929 |
| 1,902,237 | Hilpert et al. | Mar. 21, 1933 |
| 1,968,658 | Stoddard | July 31, 1934 |
| 1,991,397 | Lampman | Feb. 19, 1935 |
| 2,058,165 | McCoy | Oct. 20, 1936 |
| 2,163,865 | Bitney | June 27, 1939 |

FOREIGN PATENTS

| | | |
|---|---|---|
| 566,745 | Great Britain | Jan. 11, 1945 |